United States Patent
Carmeli et al.

(10) Patent No.: US 12,003,586 B2
(45) Date of Patent: Jun. 4, 2024

(54) DISTRIBUTED SESSION OWNER ACROSS MULTIPLE ENTITIES

(71) Applicant: Texas Instruments Incorporated, Dallas, TX (US)

(72) Inventors: Asaf Carmeli, Hod Hasharon (IL); Yaron Alpert, Hod Hasharon (IL); Barak Cherches, Ramat HaKovesh (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/131,596

(22) Filed: Dec. 22, 2020

(65) Prior Publication Data

US 2022/0201070 A1   Jun. 23, 2022

(51) Int. Cl.
*H04L 67/148* (2022.01)
*H04L 67/14* (2022.01)
*H04L 67/141* (2022.01)
*H04L 69/163* (2022.01)

(52) U.S. Cl.
CPC ............ *H04L 67/14* (2013.01); *H04L 67/141* (2013.01); *H04L 67/148* (2013.01); *H04L 69/163* (2013.01)

(58) Field of Classification Search
CPC ..... H04L 67/14; H04L 67/141; H04L 67/142; H04L 67/148; H04L 69/16; H04L 69/161; H04L 69/162; H04L 69/163; H04L 69/166
See application file for complete search history.

(56) References Cited

U.S. PATENT DOCUMENTS

| | | | |
|---|---|---|---|
| 6,601,101 B1 * | 7/2003 | Lee | H04L 67/1002 709/227 |
| 6,826,613 B1 * | 11/2004 | Wang | H04L 67/1097 709/215 |
| 7,877,490 B1 * | 1/2011 | Talagala | H04L 67/148 709/227 |
| 8,218,557 B2 | 7/2012 | Kean et al. | |
| 8,248,939 B1 * | 8/2012 | Craft | H04L 69/161 370/235 |

(Continued)

OTHER PUBLICATIONS

Kim, Hyong-youb, and Scott Rixner. "TCP offload through connection handoff." Proceedings of the 1st ACM SIGOPS/EuroSys European Conference on Computer Systems 2006. 2006. (Year: 2006).*

(Continued)

*Primary Examiner* — Vivek Srivastava
*Assistant Examiner* — William C McBeth
(74) *Attorney, Agent, or Firm* — Brian D. Graham; Frank D. Cimino

(57) ABSTRACT

In described examples, ownership of a network protocol-based session is distributed across multiple entities. A session is established between a remote entity and a first processing node on a local device, such that the first processing node is the session owner of the session on the local device. During the session, ownership of the session is transferred from the first processing node to a second processing node on the local device, such that the second processing node becomes the session owner of the session on the local device. The session is then operated between the remote entity and the second processing node as the session owner.

20 Claims, 5 Drawing Sheets

(56) References Cited

U.S. PATENT DOCUMENTS

| | | | | |
|---|---|---|---|---|
| 8,935,406 | B1* | 1/2015 | Eiriksson | H04L 69/163 |
| | | | | 709/227 |
| 9,182,808 | B1* | 11/2015 | Jones | G06F 1/3234 |
| 10,237,236 | B2 | 3/2019 | Moore et al. | |
| 2002/0143954 | A1* | 10/2002 | Aiken, Jr. | H04L 67/14 |
| | | | | 709/227 |
| 2004/0042483 | A1* | 3/2004 | Elzur | H04L 69/161 |
| | | | | 370/463 |
| 2006/0059228 | A1* | 3/2006 | Kasamsetty | H04L 67/14 |
| | | | | 709/203 |
| 2010/0195647 | A1* | 8/2010 | Wang | H04L 67/16 |
| | | | | 370/389 |
| 2012/0239725 | A1* | 9/2012 | Hartrick | H04L 69/163 |
| | | | | 709/203 |
| 2013/0067095 | A1* | 3/2013 | Kruse | H04L 67/148 |
| | | | | 709/227 |
| 2014/0304409 | A1 | 10/2014 | Kamath et al. | |
| 2014/0304499 | A1* | 10/2014 | Gopinath | H04L 67/14 |
| | | | | 713/151 |
| 2016/0255014 | A1* | 9/2016 | Shmidt | H04L 67/148 |
| | | | | 709/226 |
| 2017/0048356 | A1* | 2/2017 | Thompson | H04L 69/163 |
| 2019/0158634 | A1* | 5/2019 | Chen | H04L 69/163 |
| 2021/0075451 | A1* | 3/2021 | Murali | G06F 1/3293 |

OTHER PUBLICATIONS

"Transport Layer", Wikipedia, available at https://en.wikipedia.org/w/index.php?title=Transport_layer&oldid=987410540 on Dec. 14, 2020, pp. 1-5.

"Transmission Control Protocol", Wikipedia, available at https://en.wikipedia.org/wiki/Transmission_Control_Protocol on Dec. 3, 2020, pp. 1-14.

"CC3220 SimpleLink Wi-Fi Wireless and Internet-of-Thing Solution, a Single-Chip Wireless MCU", SWA8035A, Texas Instruments, Inc., Sep. 2016, Revised Feb. 2017, pp. 1-88.

PCT Search Report; PCT/US 2021/063018; dated Mar. 24, 2022.

* cited by examiner

DISTRIBUTED SESSION OWNER ACROSS MULTIPLE ENTITIES

TECHNICAL FIELD

This relates to distributed session owners across multiple processing entities.

BACKGROUND

In computer networking, the transport layer is a conceptual division of methods in the layered architecture of protocols in the network stack in the Internet protocol suite and the OSI (Open Systems Interconnect) model. The protocols of this layer provide host-to-host communication services for applications. It provides services such as connection-oriented communication, reliability, flow control, and multiplexing.

The Transmission Control Protocol (TCP) is one of the main protocols of the Internet protocol suite. It originated in the initial network implementation in which it complemented the Internet Protocol (IP). Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite. Secure socket layer (SSL)/transport layer security (TLS) provides packet encryption and often runs on top of TCP.

The details of implementation and semantics of the transport layer of the Internet protocol suite and the OSI model of general networking are different. The protocols in use today in this layer for the Internet originated in the development of TCP/IP. In the OSI model the transport layer is often referred to as Layer 4, or L4, while numbered layers are not used in TCP/IP.

SUMMARY

In described examples, ownership of a network protocol-based session is distributed across multiple entities at the session layer, transport layer, and/or network layer. A session is established between a remote entity and a first processing node on a local device, such that the first processing node is the temporary session owner of the session on the local device. During the session, ownership of the session is transferred from the first processing node to a second processing node on the local device, such that the second processing node becomes the temporary session owner of the session on the local device. The session is then operated between the remote entity and the second processing node as the temporary session owner.

DETAILED DESCRIPTION

Figure 1:
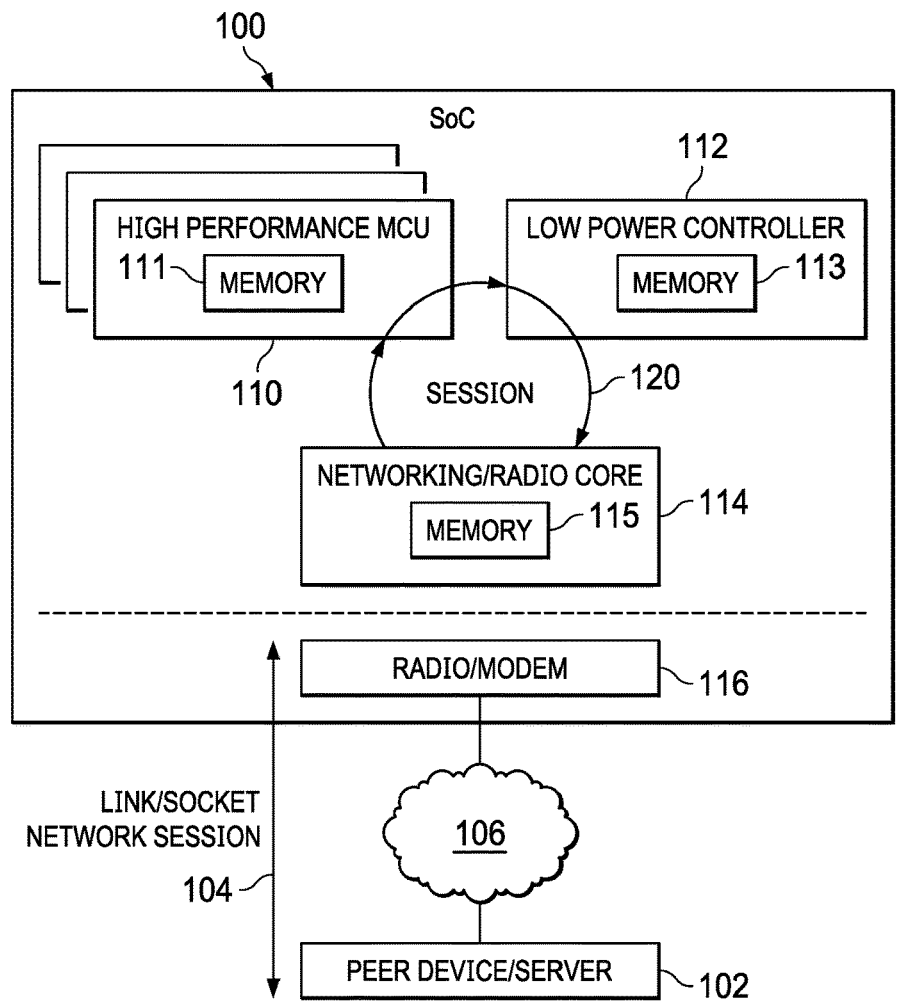
FIG. 1 is a block diagram of an example local device in communication with a peer device via a TCP session.

In the drawings, like elements are denoted by like reference numerals for consistency.

In described examples, TCP/IP is an example methodology for a variant of L3/4 type protocols. The methodology operates at a session layer (layer 5, L5), a transport layer (layer 4, L4) and/or a network layer (layer 3, L3).

TCP provides a communication service at an intermediate level between an application program and the Internet Protocol (IP). TCP provides host-to-host connectivity at the transport layer of the Internet model, also known as "layer 4" or "L4." "Layer 3" (L3) is a network layer that determines the best available path in the network for communication. An IP address is an example of layer 3.

The session layer creates communication channels, called sessions, between devices. It is responsible for opening sessions, ensuring they remain open and functional while data is being transferred, and closing them when communication ends. The session layer can also set checkpoints during a data transfer The transport layer takes data transferred in the session layer and breaks it into "segments" on the transmitting end. It is responsible for reassembling the segments on the receiving end, turning it back into data that can be used by the session layer. The transport layer carries out flow control, sending data at a rate that matches the connection speed of the receiving device, and error control, checking if data was received incorrectly and if not, requesting it again.

The network layer has two main functions. One is breaking up segments into network packets and reassembling the packets on the receiving end. The other is routing packets by discovering the best path across a physical network. The network layer uses network addresses (typically Internet Protocol addresses) to route packets to a destination node.

An application does not need to know the particular mechanisms for sending data via a link to another host, such as the required IP fragmentation to accommodate the maximum transmission unit of the transmission medium. At the transport layer, TCP handles all handshaking and transmission details and presents an abstraction of the network connection to the application typically through a network socket interface. RFC 793 was published in September 1981. It is the standard for TCP used in many computer networks including the Internet. It is published by the IETF (Internet Engineering Task Force) at http://www.ietf.org/rfc/rfc0793.txt. TCP is briefly described hereinbelow; a more detailed explanation is available at many references, for example, "Transmission Control Protocol," Wikipedia, updated 30 Nov. 2020, which is incorporated by reference herein.

A "connection" is communication channel and a "session" is a state of information exchange. A connection may have multiple sessions.

The term "session" refers to a temporary logical link that allows information exchange between two or more communicating participants (session peers). A session is managed by a user agent that is allowed to act on behalf of a user for accessing resources. This user agent is a temporary session owner.

Multiple transactions between the same client and server, completed over the same established TCP connection are considered a session. A session may also include multiple TCP connections (between the same client and server) to improve performance.

In a network, two processing nodes set up a connection to exchange data, which is referred to as a "session," and thereby become end nodes of the connection. The two end nodes synchronize with one another to manage packet flows and adapt to congestion in the network. A TCP connection is a pair of virtual circuits (one in each direction). Only the two end nodes can use a particular connection; however, a node may participate in multiple sessions with various other end nodes.

FIG. 1 is a high-level block diagram of an example local device 100 that is a multiprocessor system-on-a-chip (SoC) that may be configured to perform examples of distributed session ownership as described herein. In this example, SoC 100 is intended for use in low power applications that may be powered by a battery, such as various types of sensors and devices that are included within the "internet of things" (IOT). For example, smart thermostats, light bulbs, security sensors, cameras, etc. In particular, the example SoC 100 is an embodiment of the CC32xx low energy wireless SoC available from Texas Instruments, Inc. A high-level description of the components of SoC 100 is provided herein. More detailed descriptions of example components may be found in "CC3220 SimpleLink™ Wi-Fi® Wireless and Internet-of-Things Solution, a Single-Chip Wireless MCU," SWAS035A—September 2016, revised February 2017.

In this example, a high-performance microcontroller unit (MCU) 110 is included within SoC 100. In some examples, there may be additional high performance MCUs. MCU 110 can be turned off, or otherwise placed in a low power mode to conserve power. A low power controller 112 is configured to operate at low power and can continue to operate when MCU 110 is turned off. In some examples there may be additional low power controllers.

Software instructions implementing distributed session ownership as described herein may be stored in the memory subsystem 111, 113, and/or 115 (e.g., a computer readable medium) and may execute on one or more programmable processors of the SOC 100, e.g., the high performance MCU 110, low power controller 112, and networking/radio core 114.

A portion of the memory subsystems 111, 113, 115 includes flash memory that provides nonvolatile storage for code and data. The flash memory is in-system programmable. Another portion of the memory subsystem is SRAM (static random-access memory) that can be used for both storage of data and execution of code and is split into two 4-KB blocks and two 6-KB blocks in this example. Retention of the RAM contents in standby mode can be enabled or disabled individually for each block to minimize power consumption. Another portion is read only memory (ROM) that provides preprogrammed embedded operating system and lower layer protocol stack software.

Networking/radio core 114 includes a processor that interfaces the analog RF (radio frequency) and baseband (modem) circuits 116, handles data to and from the system side, and assembles the information bits in a given packet structure. In some examples, there may be additional networking/radio cores.

Network core 114 is capable of autonomously handling the time-critical aspects of the radio protocols (Bluetooth low energy) thus offloading the main MCU 110 and leaving more resources for the user application. The network core 114 has a dedicated 4-KB SRAM block 115 and runs initially from separate ROM memory. In this example, networking/radio core 114 is configured to perform encryption and decryption of TCP packets for SSL/TLS as they are sent/received by SoC 100.

Remote device 102 is a remotely located device that may be either a peer device or a server device, for example. In a typical application, such as in a home, remote device 102 may be located in a same room of the home as SoC 100, or in a different room of home. Remote device 102 may be a cloud-based server, for example. In either case, SoC 100 and remote device 102 can establish a link/socket network session 104 through the space 106 between them using TCP/IP.

Within SoC 100, session 120 is established to maintain socket connection 104. Multi-core SoC 100 allows handling of multiple tasks using multiple processing nodes, such as high performance MCU 110, low power controller 112, and networking/radio core 114. As described above, there may be multiple sessions in progress at any given time to allow the local device to communicate with various servers and/or peers.

In traditional client-server applications running on MCUs, the internal mechanisms for managing network sessions are proprietary to each application and are typically based on socket endpoint and on the fact that all temporary session owners run on top of the same network stack. A socket is one endpoint of a two-way communication link between two programs running on the network. A socket is bound to a port number so that the TCP layer can identify the application that data is destined to be sent to. An endpoint is a combination of an IP address and a port number.

However, each entity/core has different attributes which are better suited to conduct a specific task at any given time, such as: operating frequency vs. current consumption, wireless radios, unique external interfaces, or abilities, etc. While an entity/core opens a "session" in order to communicate, the opening entity/core is not necessary the optimal owner during the entire lifecycle of the session.

In multi-core devices it is common to find processing methods in which each core runs a single function in the processing of a packet. In these methods a packet might be transitioned from one core to another during the processing, but in those cases the network session is still managed and owned by a single owner and the session owner must remain active to keep the session connected.

Figure 2:
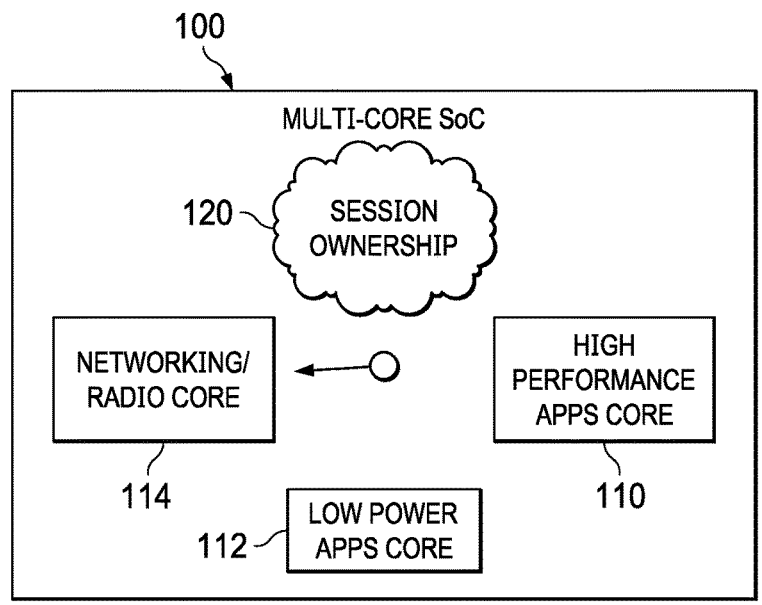
FIG. 2 is a simplified block diagram of the device of FIG. 1 illustrating distributed temporary session ownership.

FIG. 2 is a simplified block diagram of the SoC device of FIG. 1 illustrating distributed session ownership 120 in more detail. Examples described herein allow a single networking session to be handled by multiple temporary session owners such as different application processing nodes within a single device, such as SoC 100.

Each device level temporary session owner is responsible for a specific portion of the session flow and preserves the session state parameters. However, the flow can bounce between the temporary session owners in order to optimize desired parameters, such as power consumption. In this manner, each network session event (generation and reception) is routed between two or more temporary session owners running on the same device, such as SoC 100.

Each networking session event will be routed to the right session owner based on a set of negotiation and/or notification and/or dynamic/static configurations, where every temporary session owner can have the capability to respond or generate session networking events based on the received information or user-generated events, at a particular time, or to decide to transfer the session ownership to another temporary session owner and/or send notifications to other processing entities. Negotiations involve two-way signaling, while notifications involve only one-way signaling. Dynamic or static configurations require no signaling.

Two modes are defined for each temporary session owner: serving or non-serving. The serving session owner is the temporary session owner that is currently handling the session transactions. Typically, each transaction is required to send/receive data to/from a remote node, process the data, and respond to the remote node. At any particular time, there will be only single temporary serving session owner per specific transaction. Non-serving session owners are the other session owners that are not involved in any specific session transactions at a particular time.

Distributed session ownership includes three main building blocks. Distributed coordinated session datagram reception handling provides the ability to send the received data from the network to the correct temporary session owner in a continued manner for the duration of the session. In some examples, several potential temporary session owners may receive from the network but then only one of the potential temporary session owners takes over as the temporary session owner and processes the data and responds to the remote network node. Distributed coordinated session datagram generation handling provides the ability to get the data to be transmitted from the correct temporary session owner in a continued manner during the session and the ability to maintain the session by generating the appropriate response on the stack layer. Distributed coordinate control provides transparent and secured transition between session owners without losing data or breaking the session. A non-serving session owner is not required to operate on behalf of the session and may be placed in a low power state, thus conserving power.

Referring still to FIG. 2, session ownership 120 can be visualized as a token that is passed to different processing nodes. As used herein, the term "processing node," "node," and "core," all refer to an individual processing unit within an SoC. A processor core receives software instructions from a single computing task, working at a defined clock speed to quickly process this information and temporarily store results in an available memory, such as a RAM.

The processing node that currently holds the token is the serving temporary session owner, the other nodes are non-serving session owners. For example, in SoC 100, three potential session owners are illustrated: high performance application core 110, low power application core 112, and a networking/radio core 114. As will be explained in more detail hereinbelow, at any given time the session ownership token is held by only one of these three potential session owners while the other two non-serving session owners do not participate in the session transaction at that given time.

Figure 3:
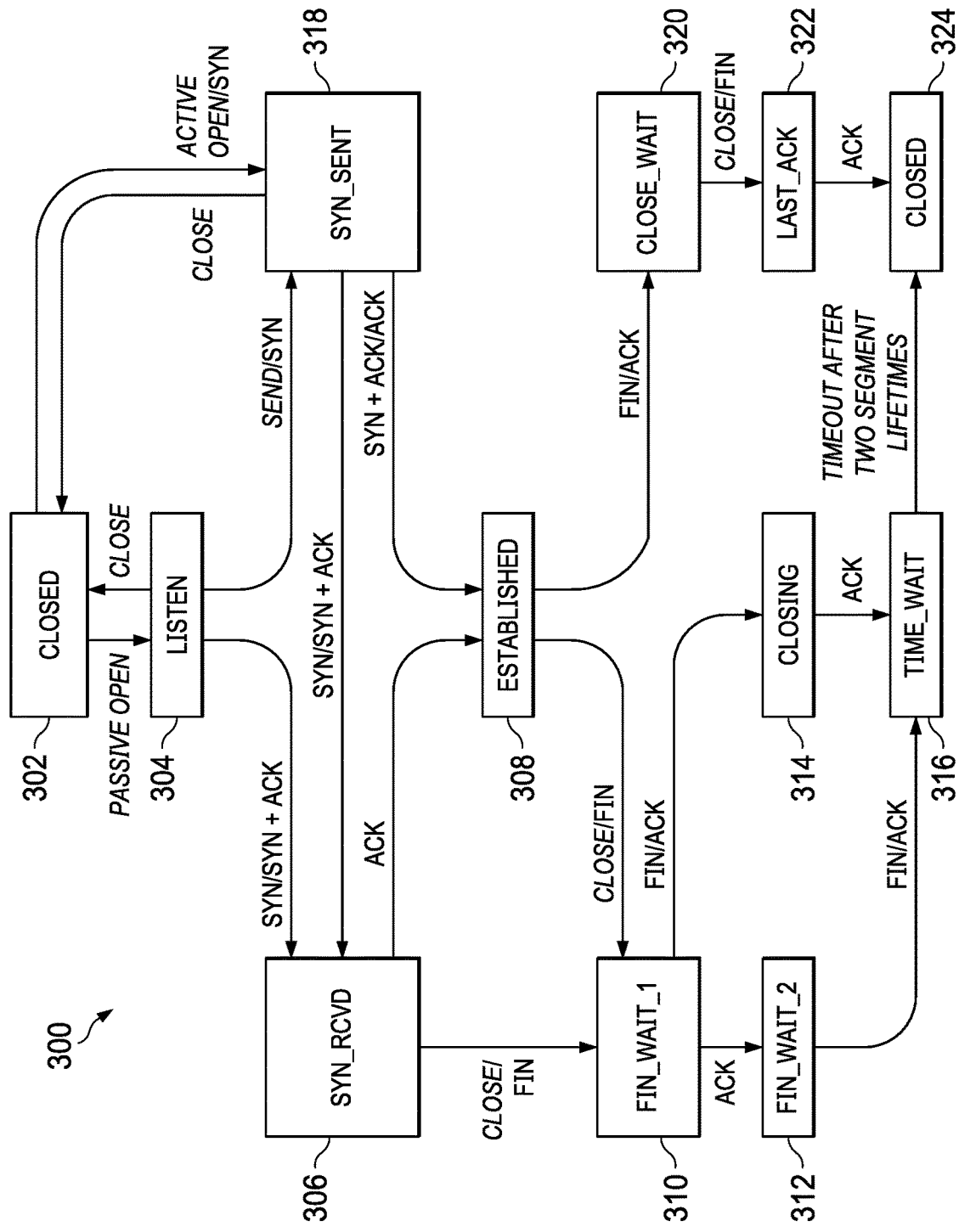
FIG. 3 illustrates a simplified TCP state diagram.

FIG. 3 illustrates a simplified TCP state diagram 300. TCP is connection-oriented, and a connection between client and server is established before data can be sent. The server must be listening (passive open) for connection requests from clients before a connection is established. Three-way handshake (active open), retransmission, and error-detection adds to reliability but lengthens latency.

TCP protocol operations may be divided into three phases: connection establishment, data transfer, and connection termination. Connection establishment is a multi-step handshake process that establishes a connection before entering the data transfer phase. After data transmission is completed, the connection termination closes the connection and releases all allocated resources.

At the lower levels of the protocol stack, due to network congestion, traffic load balancing, or unpredictable network behavior, IP packets may be lost, duplicated, or delivered out of order. TCP detects these problems, requests re-transmission of lost data, rearranges out-of-order data and even helps minimize network congestion to reduce the occurrence of the other problems. If the data still remains undelivered, the source is notified of this failure. Once the TCP receiver has reassembled the sequence of octets originally transmitted, it passes them to the receiving application. Thus, TCP abstracts the application's communication from the underlying networking details.

TCP is used extensively by many internet applications, including the World Wide Web (WWW), email, File Transfer Protocol, Secure Shell, peer-to-peer file sharing, and streaming media. TCP is optimized for accurate delivery rather than timely delivery and can incur relatively long delays (on the order of seconds) while waiting for out-of-order messages or re-transmissions of lost messages. Therefore, it is not particularly suitable for real-time applications such as voice over IP.

TCP is a reliable stream delivery service which guarantees that all bytes received will be identical and in the same order as those sent. Since packet transfer by many networks is not reliable, TCP achieves this using a technique known as positive acknowledgement with re-transmission. This requires the receiver to respond with an acknowledgement message as it receives the data. Packets are numbered so that the destination can reorder packets and determine if a packet is missing. The sender keeps a record of each packet it sends and maintains a timer from when the packet was sent. The sender re-transmits a packet if the timer expires before receiving the acknowledgement. The timer is needed in case a packet gets lost or corrupted. A checksum technique is used to verify that packets are not corrupted.

While IP handles actual delivery of the data, TCP keeps track of segments, which are the individual units of data transmission that a message is divided into for efficient routing through the network. For example, when an HTML, file is sent from a web server, the TCP software layer of that server divides the file into segments and forwards them individually to the internet layer in the network stack. The internet layer software encapsulates each TCP segment into an IP packet by adding a header that includes (among other data) the destination IP address. When the client program on the destination computer receives them, the TCP software in the transport layer re-assembles the segments and ensures they are correctly ordered and error-free as it streams the file contents to the receiving application.

These services run in the processor nodes at either end of a connection, referred to herein as "end nodes," not in the network itself. Therefore, TCP is a protocol for managing end-to-end connections. Since end-to-end connections may exist across a series of point-to-point connections, they are often called virtual circuits.

A TCP connection is managed through a resource that represents the local endpoint for communications, the Internet socket. During the lifetime of a TCP connection, the local endpoint undergoes a series of state changes as shown in state diagram 300.

At 302, CLOSED (both server and client) represents no connection state at all.

At 304, LISTEN (server) represents waiting for a connection request from any remote TCP endpoint.

At 318, SYN-SENT (client) represents waiting for a matching connection request after having sent a connection request.

At 306, SYN-RECEIVED (server) represents waiting for a confirming connection request acknowledgment after having both received and sent a connection request.

At 308, ESTABLISHED (both server and client) represents an open connection, data received can be delivered to the user. This is the normal state for the data transfer phase of the connection.

At 310, FIN-WAIT-1 (both server and client) represents waiting for a connection termination request from the remote TCP, or an acknowledgment of the connection termination request previously sent.

At 312, FIN-WAIT-2 (both server and client) represents waiting for a connection termination request from the remote TCP.

320, CLOSE-WAIT (both server and client) represents waiting for a connection termination request from the local user.

At 314, CLOSING (both server and client) represents waiting for a connection termination request acknowledgment from the remote TCP.

At 322, LAST-ACK (both server and client) represents waiting for an acknowledgment of the connection termination request previously sent to the remote TCP (which includes an acknowledgment of its connection termination request).

At 316, TIME-WAIT (either server or client) represents waiting for enough time to pass to be sure the remote TCP received the acknowledgment of its connection termination request. According to RFC 793 a connection can stay in TIME-WAIT for a maximum of four minutes known as two maximum segment lifetimes (MSL).

At 324, CLOSED (both server and client) represents no connection state at all.

While an end point device needs to perform the various states illustrated, in described examples, the session owner may be distributed among various computing resources such as illustrated for SoC 100, see FIG. 2.

Figure 4:
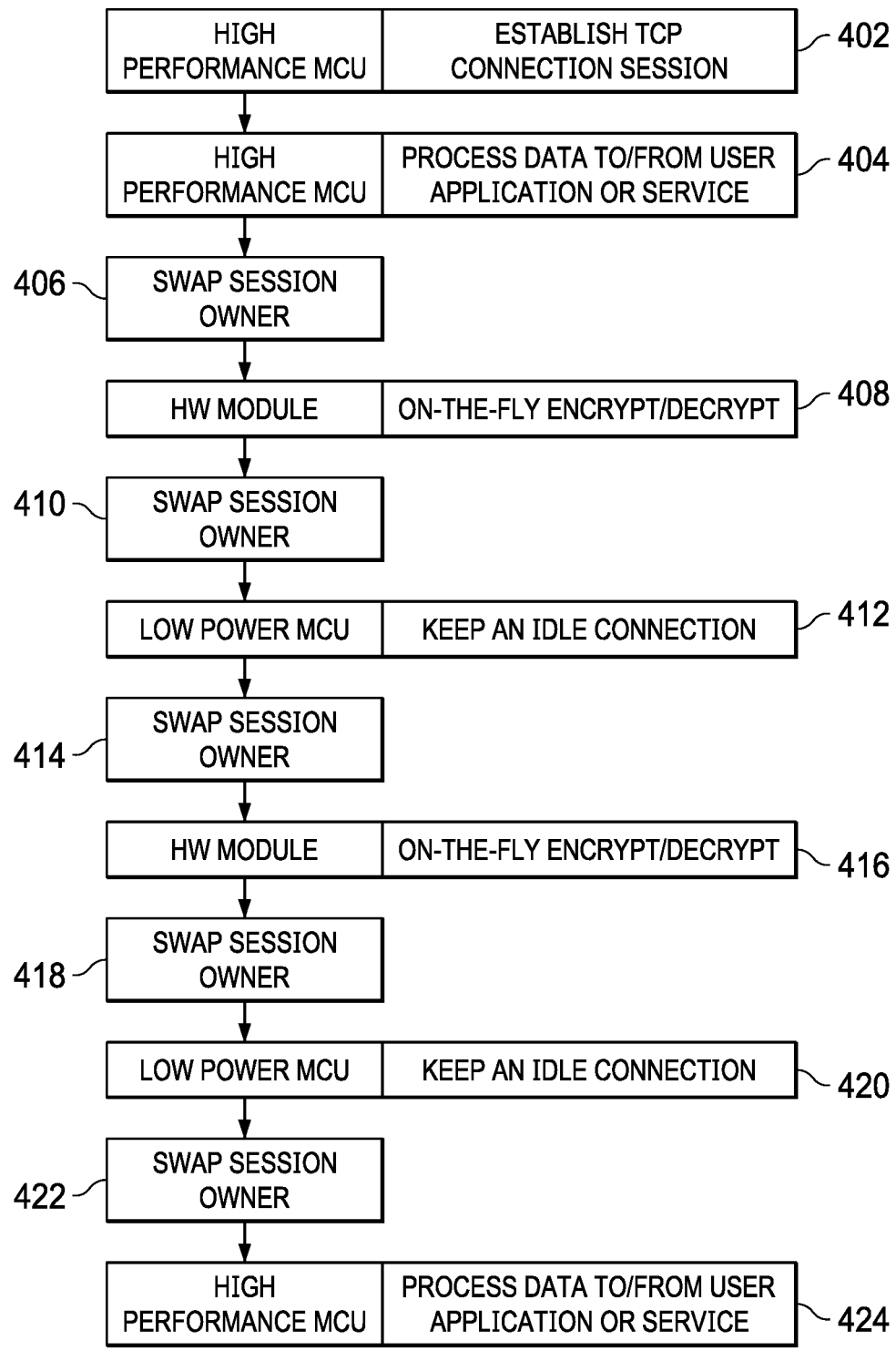
FIG. 4 is a flow diagram of an example TCP session using distributed temporary session ownership.

FIG. 4 is a flow diagram of an example TCP protocol session using distributed session ownership. In this example, a local device, such as SoC 100 (see FIG. 1) is communicating with a remote device such as server or peer device 102 (FIG. 1) using a protocol session, such as a TCP/IP socket 104 (FIG. 1), as described in more detail above. The remote device may be a server in the cloud, for example, or a peer device located nearby.

The local device in this example has three potential session owners: a high performance MCU such as MCU 110 (FIG. 1), low power MCU, such as controller 112 (FIG. 1), and a hardware accelerator (HW) module, such as networking core 114 (FIG. 1). Both MCU owners can handle TCP traffic, but each have different behavior and impact. The high-performance MCU can handle any kind of traffic but consumes more power. The low power MCU consumes very low power but can handle (from resources perspective) only slow traffic and cannot handle reception of TCP fragments, for example. The HW module is equipped to perform encryption and decryption faster than the high-performance MCU using less power.

At 402, a TCP protocol connection session is established between the remote device and the local device. In this example, the high performance MCU on the local device, establishes the connection and become the temporary session owner.

At 404, data is received by the temporary session owner from the remote device. The received TCP packets are encrypted to provide security using SSL/TLS.

At 406, session ownership is transferred and the HW module becomes the new temporary session owner.

At 408, the HW module performs the decryption using hardware optimized for that purpose. Once the decryption is complete, there may be nothing else for the high performance MCU and HW module to do; however, the protocol session needs to be maintained or it will be disconnected.

At 410, session ownership is transferred to the low power MCU.

At 412, the high performance MCU and the HW module enter a low power or sleep mode to conserve power. Meanwhile, the low power MCU continues to monitor the protocol session and sends required status updates in response to queries from the remote device that typically occur every few seconds. The low power MCU is capable of handling very low traffic and can keep this socket alive while most of the system including the high performance MCU are in low power mode When the low power controller receives traffic that it cannot handle (such as from TCP fragments), it will wake-up the high performance MCU and initiate ownership exchange. In this exchange sequence, the unhandled TCP fragment message, which triggered the exchange, would be queued in the special queue that is used in the exchange process.

At 414, session ownership is transferred to the HW module.

At 416, the HW module performs description of the received packets. Once the packet reception is complete, the HW module can return to low power mode.

At 418, session ownership is transferred back to the low power control.

At 420, the low power controller monitors the protocol session and sends required status updates in response to queries from the remote device that typically occur every few seconds. The low power MCU is capable of handling very low traffic and can keep this socket alive while most of the system, including the high performance MCU, is in low power mode When the low power MCU receives traffic that it cannot handle, it will wake-up the high performance MCU and initiate ownership exchange. In this exchange sequence, the unhandled TCP fragment message, which triggered the exchange, would be queued in the special queue that is used in the exchange process.

At 422, session ownership is transferred to the high performance MCU.

At 424, the high-performance MCU processes data that has been received or that needs to be sent to/from the remote device.

Swapping of session ownership continues in this manner for as long as the protocol session needs to be maintained. In this manner, the connection can remain open for a long period of time without expending a large amount of power by keeping the high performance MCU and the HW module in a low power or sleep state except when needed to process data packets.

Figure 5:
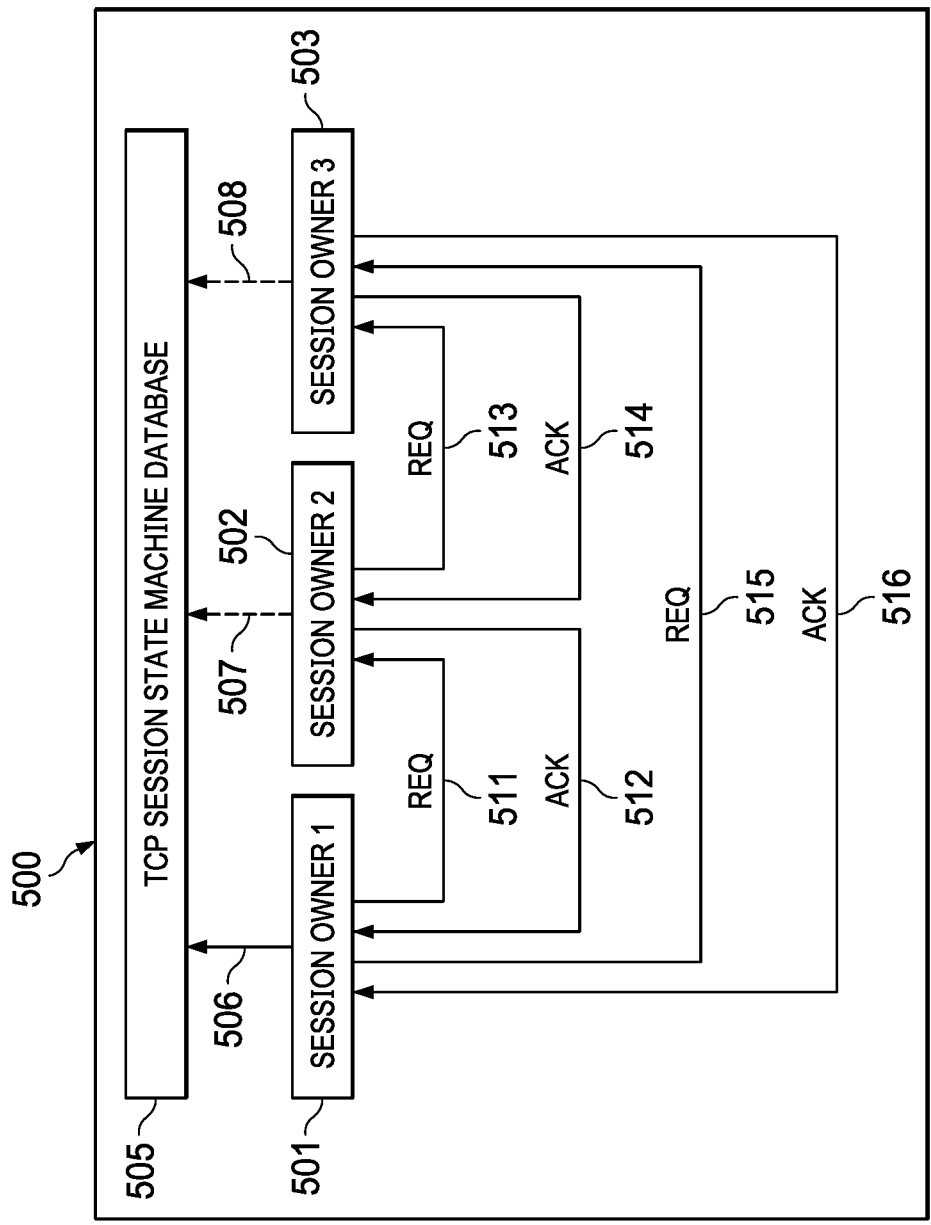
FIG. 5 is a diagram illustrating an example session ownership transfer.

FIG. 5 is a diagram illustrating an example session ownership exchange. In this example, a local device 500 has three processing nodes 501, 502, 503 that are each potential session owners, such as described in FIG. 2. As defined by the TCP standard, each connection session is managed separately and has its own state machine, such as illustrated in FIG. 3. In this example, the state of a session is kept in a common database 505 that is a data structure stored in a memory location within device 500 that is accessible to each processing node 501, 502, 503.

As described above, a protocol session is established by a first processing node, such node 501, and becomes the temporary session owner. A pointer 506 is established that defines the location of common database 505. As temporary session owner 1, node 501 updates common database 505 each time the state of the protocol session changes.

A transfer of session owners contains two major steps: an exchange agreement and an exchange activation. In order to create the exchange agreement, the active owner requests the target owner to take ownership by sending a message to the target owner. The target owner agrees to take ownership and replies with acknowledge message. For example, when processing node 501 is the active session owner, it can send a request (REQ) message 511 to a target session owner, such as processing node 502. Processing node 502 then sends an acknowledgement (ACK) 512 message back to processing node 501.

Exchange activation proceeds upon reception of the acknowledge message 512. The active owner switches the traffic from the upper and lower protocol layers to the new owner. If the active owner received some messages during the exchange agreement step and before the switch of the traffic, it would push them to a special queue. On completion of those steps the active owner sends an additional message to the target owner to activate it. From this point the target owner become the serving temporary session owner. The new temporary session owner sends acknowledge on reception of this message. In this example, processing node 502 is given access to the TCP session database 505 in device memory using pointer 507. Processing node 503 can access the TCP common database 505 in device memory using pointer 508.

In a similar manner, session ownership can be transferred, or swapped, between each of the three potential session owners using Req/Ack messages 513/514 or 515/516. In some examples, a one-way notification may be used in place of two-way negotiation to transfer session ownership to a different potential session owner.

Figure 6:
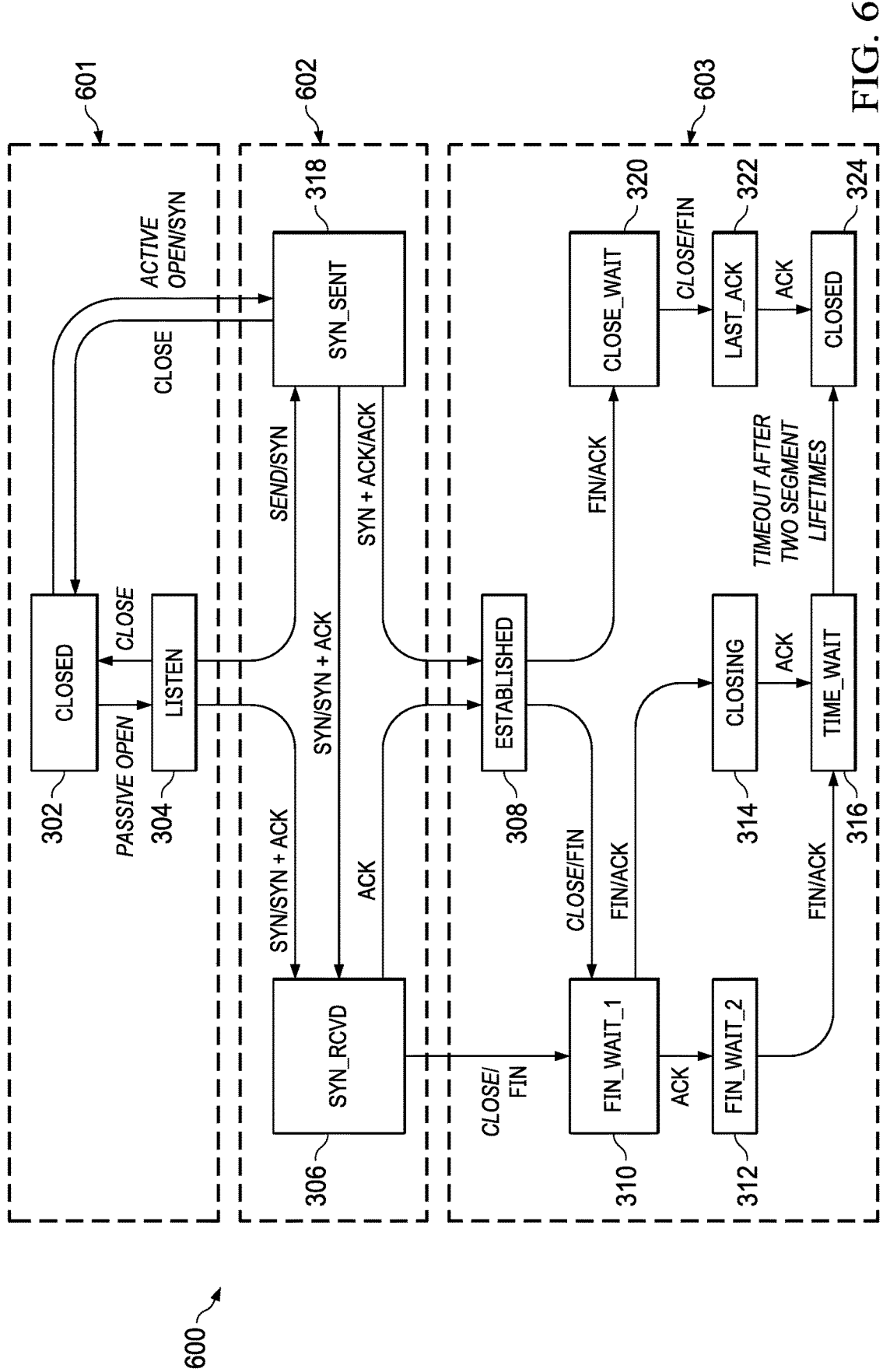
FIG. 6 is another example session ownership transfer.

FIG. 6 is another example session ownership exchange. In this example, session ownership is defined by the current state of the TCP state diagram. For example, a processing node 601 may be configured to process the CLOSED 302 and LISTEN 304 states as the temporary session owner, as indicated by the dotted box. Once the session progresses to SYN RCVD 306 or SYN SENT 318, processing node 602 becomes automatically (based on the configuration) the temporary session owner. When the session progresses to any of the remaining states, processing node 603 becomes the temporary session owner.

In this example, the current temporary session owner is responsible for handling a specific set of states and possess the incoming information generating the outcome signaling, accordingly, that derives the state transitions.

In this example, the configuration is static and does not change. It may be configured by a system designer and defined by software or firmware code that is included in the memory of the local node. While a particular example configuration is illustrated by FIG. 6, in other example that various TCP states may be configured to be performed by a different allocation of processing nodes.

In another example, the configuration may be dynamic. In this case, an external event outside of the L3/L4 protocol may occur that requires device resource reallocation. In another example, application software or a user interacting with the local device may request or require device resource reallocation.

In described examples, the ability to have session continuity while choosing and switching between different entities can dramatically increase overall device efficiency by reducing power consumption; enabling faster processing time; and/or decreasing latency.

The ability to swap session owner during session lifetime and keep session continuity is provided.

The ability to choose the optimal session owner at any time, according to capabilities and/or SoC load is provided.

The ability to offload activities to allow better power consumption is provided.

Other Embodiments

In described examples, a local device is a system on a chip that is fabricated on a single integrated circuit (IC). In another example, a local device may include two or more IC's that are packaged in a single multi-chip package. In another example, the local device may include two or more IC's that are packaged in separate packages that are mounted on a substrate and interconnected, for example.

In described examples, TCP/IP protocol defines operation of a session during network communication. The distributed session ownership applies primarily to the transport layer. In another example, a different known or later developed protocol may be managed using distributed session owners as described herein. Various know protocols are described in more detail in "Transport Layer," Wikipedia, updated Nov. 6, 2020.

The techniques described in this disclosure may be implemented in hardware, software, firmware, or any combination thereof. If implemented in software, the software may be executed in one or more processors, such as a microprocessor, low power microcontroller, application specific hardware accelerator, field programmable gate array (FPGA), digital signal processor (DSP), etc. The software that executes the techniques may be initially stored in a computer-readable medium such as compact disc (CD), a hard drive, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., optical disk, flash memory, USB key).

In another example, the techniques described herein may be implemented partially or completely using hardware having hard wired logic configured to perform the distributed session ownership technique.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. A method comprising:
   determining whether a first processing node of a device is to become a session owner of a session between the device and a remote entity based on whether the session is in a first set of states that includes a first state associated with waiting for a connection request for the session from the remote entity, wherein the session further includes a second set of states that includes a second state associated with waiting for a confirming connection request acknowledgment from the remote entity after having both received and sent a connection request for the session;

responsive to determining that the first processing node is not to become the session owner, determining whether to transfer ownership of the session to a second processing node of the device based on whether the session is in the second set of states;

responsive to determining to transfer ownership of the session to the second processing node, sending a request from the first processing node to the second processing node for the second processing node to take ownership of the session;

after sending the request and before receiving an acknowledgement to the request from the second processing node, receiving, by the first processing node via the session, a message; and queuing, by the first processing node, the received message;

receiving the acknowledgment to the request from the second processing node;

transferring ownership of the session to the second processing node, such that the second processing node becomes the session owner; and processing, by the second processing node, the received message.

2. The method of claim 1, further comprising:
transferring ownership of the session from the second processing node to the first processing node, such that the first processing node becomes the session owner on the device; and
operating the session between the remote entity and the first processing node as the session owner.

3. The method of claim 2, further comprising:
transferring ownership of the session from the first processing node to a third processing node on the device, such that the third processing node becomes the session owner on the device; and
operating the session between the remote entity and the third processing node as the session owner.

4. The method of claim 1, wherein whether the first processing node is to become the session owner is determined based on power consumption of the first processing node in addition to whether the session is in the first set of states.

5. The method of claim 1, further comprising:
establishing a common database in memory on the device accessible by the first processing node and the second processing node, such that the common database defines a current state of the session;
updating the common database by the first processing node while the first processing node is the session owner; and
updating the common database by the second processing node while the second processing node is the session owner.

6. The method of claim 1, wherein whether to transfer ownership of the session to the second processing node is determined based on power consumption of the second processing node in addition to whether the session is in the second set of states.

7. The method of claim 1, wherein the session is a transmission control protocol (TOP) communication session.

8. A device comprising:
a first processing node and a second processing node;
a network interface controllably coupled to the first and second processing nodes; and
memory storing instructions accessible by the first and second processing nodes, wherein when executed by the first and second processing nodes, the instructions cause the device to:
determine whether the first processing node is to become a session owner of a session between the device and a remote entity based on whether the session is in a first set of states that includes a first state associated with waiting for a connection request for the session from the remote entity, wherein the session further includes a second set of states that includes a second state associated with waiting for a confirming connection request acknowledgment from the remote entity after having both received and sent a connection request for the session;
responsive to a determination that the first processing node is not to become the session owner of the session, determine whether to transfer ownership of the session to the second processing node of the device based whether the session is in the second set of states;
responsive to a determination to transfer ownership of the session to the second processing node, send a request from the first processing node to the second processing node for the second processing node to take ownership of the session;
after sending the request and before receiving an acknowledgement to the request from the second processing node, receive, by the first processing node via the session, a message; and queue, by the first processing node, the received message;
receive, by the first processing node, the acknowledgment to the request from the second processing node;
transfer, by the first processing node, ownership of the session to the second processing node, such that the second processing node becomes the session owner; and
process, by the second processing node, the received message.

9. The device of claim 8, wherein whether the first processing node is to become the session owner is determined based on power consumption of the first processing node in addition to whether the session is in the first set of states.

10. The device of claim 8, wherein the instructions further cause the device to:
transfer ownership of the session from the second processing node to the first processing node, such that the first processing node becomes the session owner on the device; and
operate the session between the remote entity and the first processing node as the session owner.

11. The device of claim 10, further comprising a third processing node coupled to the network interface; wherein the instructions further cause the device to:
transfer ownership of the session from the first processing node to the third processing node, such that the third processing node becomes the session owner on the device; and
operate the session between the remote entity and the third processing node as the session owner.

12. The device of claim 8, wherein the instructions further cause the device to:
send an ownership switch indication from the first processing node to the second processing node, such that the second processing node becomes the session owner on the device.

13. The device of claim 8, wherein the instructions further cause the device to:
establish a common database in the memory on the device accessible by the first processing node and the second processing node, such that the common database defines a current state of the session;
update the common database by the first processing node while the first processing node is the session owner; and
update the common database by the second processing node while the second processing node is the session owner.

14. The a device of claim 8, wherein whether to transfer ownership of the session to the second processing node is determined based on power consumption of the second processing node in addition to whether the session is in the second set of states.

15. The device of claim 8, wherein the session is a transmission control protocol (TOP) communication session.

16. The device of claim 8, wherein the first and second processing nodes and the network interface are included within a single integrated circuit.

17. A non-transitory computer readable medium storing software instructions that, when executed by a first and a second processing nodes on a device, causes the device to:
determine whether the first processing node is to become a session owner of a session between the device and a remote entity based on whether the session is in a first set of states that includes a first state associated with waiting for a connection request for the session from the remote entity, wherein the session further includes a second set of states that includes a second state associated with waiting for a confirming connection request acknowledgment from the remote entity after having both received and sent a connection request for the session;
responsive to a determination that the first processing node is not to become the session owner of the session, determine whether to transfer ownership of the session to the second processing node of the device based on whether the session is in the second set of states;
responsive to a determination to transfer ownership of the session to the second processing node, send a request from the first processing node to the second processing node for the second processing node to take ownership of the session;
after sending the request and before receiving an acknowledgement to the first request from the second processing node,
receive, by the first processing node via the session, a message; and
queue, by the first processing node, the received message;
receive the acknowledgment to the request from the second processing node;
transfer ownership of the session to the second processing node, such that the second processing node becomes the session owner; and
process, by the second processing node, the received message.

18. The non-transitory computer readable medium of claim 17, wherein whether the first processing node is to become the session owner is determined based on power consumption of the first processing node in addition to whether the session is in the first set of states.

19. The non-transitory computer readable medium of claim 17, wherein the software instructions, when executed, further causes the device to:
establish a common database in memory on the device accessible by the first processing node and the second processing node, such that the common database defines a current state of the session;
update the common database by the first processing node while the first processing node is the session owner; and
update the common database by the second processing node while the second processing node is the session owner.

20. The non-transitory computer readable medium of claim 17, wherein whether to transfer ownership of the session to the second processing node is determined based on power consumption of the second processing node in addition to whether the session is in the second set of states.

* * * * *